(12) United States Patent
Freger

(10) Patent No.: US 7,481,106 B2
(45) Date of Patent: Jan. 27, 2009

(54) NON-INVASIVE METHOD FOR DETECTING AND MEASURING FILLING MATERIAL IN VESSELS

(75) Inventor: David I. Freger, Ashkelon (IL); Alexander M. Raykhman, legal representative, East Greenwich, RI (US)

(73) Assignee: Ultimo Measurement, LLC, Scituate, RI (US)

( * ) Notice: Subject to any disclaimer, the term of this patent is extended or adjusted under 35 U.S.C. 154(b) by 0 days.

(21) Appl. No.: 11/599,505

(22) Filed: Nov. 14, 2006

(65) Prior Publication Data
US 2007/0068248 A1    Mar. 29, 2007

Related U.S. Application Data

(62) Division of application No. 11/020,700, filed on Dec. 23, 2004, now Pat. No. 7,162,922.

(60) Provisional application No. 60/532,747, filed on Dec. 23, 2003.

(51) Int. Cl.
*G01F 23/28* (2006.01)
(52) U.S. Cl. .................................... 73/290 V
(58) Field of Classification Search .............. 73/290 V, 73/579; 340/613, 621; 702/55, 56; 367/908; 342/124; 33/719
See application file for complete search history.

(56) References Cited

U.S. PATENT DOCUMENTS

| | | | |
|---|---|---|---|
| 4,117,716 A | * | 10/1978 | Simon ........................ 73/32 A |
| 4,182,177 A | * | 1/1980 | Prough ...................... 73/290 V |
| 4,574,328 A | | 3/1986 | Maier .......................... 361/284 |
| 4,896,536 A | | 1/1990 | Benz ......................... 73/290 V |
| 4,954,997 A | | 9/1990 | Dieulesaint et al. ........... 367/13 |
| 5,015,995 A | | 5/1991 | Holroyd ...................... 340/621 |

(Continued)

FOREIGN PATENT DOCUMENTS

JP    11-248514    9/1999

OTHER PUBLICATIONS

Cover, and excerpt from "Marks' Standard Handbook for Mechanical Engineers", 10th Edition, by Eugene A. Avallone and Theodore Baumeister III, McGraw-Hill, p. 12-117.

(Continued)

*Primary Examiner*—Hezron Williams
*Assistant Examiner*—Tamiko D Bellamy
(74) *Attorney, Agent, or Firm*—McCormick, Paulding & Huber LLP

(57) ABSTRACT

A non-invasive method for measuring the level of filling material in a vessel and for detecting the presence of the filling material in the vessel at a predetermined set point level is based on monitoring the oscillation of the vessel's outside wall that follows an impact load applied to the external surface of the vessel's wall. The method may employ short range level measurement and long range level measurement procedures. The short-range level measurement utilizes the macro-dynamic properties of the oscillating space in the vicinity of the center of the impact. The long-range level measurement utilizes the properties of the transverse elastic waves propagating along the vessel's wall after the impact. The value of the measured level may be determined by a joint evaluation of the output of the short range level measurement procedure and the output of the long range level measurement procedure.

20 Claims, 3 Drawing Sheets

U.S. PATENT DOCUMENTS

| | | | | |
|---|---|---|---|---|
| 5,207,098 | A | | 5/1993 | Koch et al. ............... 73/290 R |
| 5,261,274 | A | * | 11/1993 | Nemirow .................... 73/149 |
| 5,531,639 | A | | 7/1996 | Catalfamo ................ 451/456 |
| 5,610,611 | A | | 3/1997 | McEwan .................... 342/89 |
| 5,631,633 | A | | 5/1997 | Dreyer et al. .............. 340/621 |
| 5,699,151 | A | | 12/1997 | Akasu ...................... 356/5.01 |
| 5,755,136 | A | * | 5/1998 | Getman et al. ............ 73/290 V |
| 5,793,704 | A | | 8/1998 | Freger ........................ 367/95 |
| 5,822,275 | A | | 10/1998 | Michalski .................... 367/99 |
| 5,862,431 | A | | 1/1999 | Christensen ................ 399/27 |
| 5,877,997 | A | | 3/1999 | Fell ............................. 367/99 |
| 5,892,576 | A | | 4/1999 | Gaechter ................ 356/5.05 |
| 6,040,898 | A | | 3/2000 | Mrosik et al. ............ 356/5.09 |
| 6,105,425 | A | | 8/2000 | Kawakatsu ............... 73/290 V |
| 6,111,211 | A | | 8/2000 | Dziedzic et al. ........... 200/61.2 |
| 6,122,602 | A | | 9/2000 | Michalski et al. .......... 702/159 |
| 6,128,982 | A | | 10/2000 | Gwin, Sr. .................... 81/452 |
| 6,166,995 | A | | 12/2000 | Hoenes ........................ 367/99 |
| 6,192,751 | B1 | | 2/2001 | Stein et al. ................ 73/290 V |
| 6,448,782 | B1 | | 9/2002 | Pakonen et al. ............ 324/536 |
| 6,452,467 | B1 | | 9/2002 | McEwan .................... 333/240 |
| 6,472,887 | B1 | | 10/2002 | Tullis et al. ................ 324/663 |
| 6,481,276 | B1 | | 11/2002 | Neuhaus et al. ........... 73/304 C |
| 6,631,639 | B1 | | 10/2003 | Dam et al. ................ 73/290 V |
| 7,162,922 | B2 | | 1/2007 | Freger et al. ............... 73/270 V |
| 7,216,536 | B2 | * | 5/2007 | Young et al. ............... 73/290 V |

OTHER PUBLICATIONS

Cover and excerpt from "The Theory of Sound" by John William Strutt, et al., vol. I, Second Edition, Dover Publications, pp. 180, 181, 246, 247.

Webpages with "Vessel Check ST" marketing materials, from www.canongatechnology.co.uk. (4 pages).

Webpages for "VBS Series" from www.stiautomaticproducts.com. (3 pages).

Webpages from www.hitech.com including excerpt of on-line article "Penetrating Pulse Technology". (4 pages).

Webpages from www.astronet.ru including excerpt from on-line article "Earth's Crust Resesarch: Geophysical Methods" and concise explanation of relevance in English. (8 pages).

Cover, Forward, and excerpts from B. M. Yavorsky and A.A. Detlaf, Physics Handbook, 3rd edition, M. Nauka, 1990 and concise explanation of relevance in English. (5 pages).

Office Action and translation for Chinese Patent Application Serial No. 2004800420394 dated Sep. 7, 2007.

PCT Search Report for Serial No. PCT/US04/43385 dated May 4, 2006.

* cited by examiner

Scale Factor 1 ms per major grid line

Scale Factor 1 ms per major grid line

NON-INVASIVE METHOD FOR DETECTING AND MEASURING FILLING MATERIAL IN VESSELS

CROSS REFERENCE TO RELATED APPLICATIONS

This application is a Divisional Application of U.S. patent application Ser. No. 11/020,700 entitled "Non-invasive Method for Detecting and Measuring Filling Material in Vessels", filed on Dec. 23, 2004, and claims the benefit of the filing date thereof under 35 USC § 120. This application claims the benefit of and priority from U.S. Provisional Patent Application Ser. No. 60/532,747, filed 23 Dec. 2003, which is hereby incorporated by reference in its entirety.

BACKGROUND OF THE INVENTION

1. Field of the Invention

The invention relates to methods for measuring a filling material level in vessels and for detecting filling material presence in vessels.

2. Description of the Related Art

The need to know about the presence of a filling matter in a vessel, as well as the quantitative information about the space that the filling matter occupies in the vessel, is evident in many industrial and domestic applications. Accordingly, a variety of methods and devices are described in the scientific and technical literature. Methods for filling material level measurement could be grouped by the following five considerations:

1. Invasive vs. Non-invasive
2. Dependence of the method upon the vessel's material
3. Dependence of the method upon the filling material
4. Invariance to environmental disturbances
5. Safety Of these, the primary consideration is invasive versus non-invasive because this consideration is the most serious constraint for the measuring method and the measuring apparatus implementing the method. Therefore, the prior art methods will be discussed from the position of invasiveness first of all. Invasive methods require the presence of a measuring device's element inside the vessel; non-invasive methods are limited to those that do not require a measuring device's element inside the vessel. The number of invasive methods is noticeably larger then the number of non-invasive methods. The former methods could utilize the principals of Time Domain Reflectometry of very short electrical pulses (TDR) that " . . . are propagated along a transmission line or guide wire that is partially immersed in the material being measured. . . . Reflected pulses are produced at the material interface due to the change in dielectric constant. . . . " The time difference between the launched and reflected pulses is used to determine the material level, as disclosed in U.S. Pat. Nos. 5,610,611, 6,452,467 and 6,481,276. This approach is usable in continuous and set-point level measurement applications.

Another known approach to the material presence detection and the filling material level measurement is based on monitoring the dynamic properties of a mechanical system comprised of an oscillatory structure directly contacting the filling material as disclosed in U.S. Pat. Nos. 5,631,633, 4,896,536, 6,105,425 and 5,862,431. Some solutions suggest using a mechanical arm with one end fixed at a predetermined level and the opposite end attached to a switch, to provide for a level relay control or set point level measurement of the filling material. U.S. Pat. No. 6,111,211 issued to Dziedzic et al, serves as an example of the above-described invasive method for the set point level measurement. Among the methods that exploit monitoring the dynamic properties of a mechanical system, U.S. Pat. No. 4,954,997 issued to Dieulesaint, et al. represents a set-point liquid level measurement solution that monitors changes in the parameters of the Lamb elastic waves in the detection plate. These waves are generated by a transmitter and are received by a receiver of the measuring system. The plate is installed at a predetermined level inside of a tank. The parameters of the Lamb wave change dramatically at the moment the detection plate contacts the filling liquid, thereby allowing the set-point level measurement. Scientific Technologies, Inc., manufactures another vibrating level sensor, VBS series. The sensor is described in the company website www.stiautomationproducts.com: "The VBS series is designed specifically for solid level detection in very small hoppers less than 3 ft (1 m) tall. The VBS is a compact diaphragm vibration switch for use with dry solids at atmospheric pressures." "The sensitivity may vary depending on the apparent specific gravity and fluidity of the powder," thus the detection sensitivity depends on the buried portion of the diaphragm in the vertical direction.

A large group of methods is based on the capacitive properties of the filling material. According to these methods, at least one member of the measuring capacitor is located within the container. The electrical capacitance of the measuring capacitor varies depending on the amount of filling material and could be calculated to correspond to the measured level. U.S. Pat. Nos. 5,207,098 and 4,574,328 illustrate such invasive capacitive methods.

Although limited by the constraints of specific applications, every ultrasound, electromagnetic, and laser method for distance measurement and their combinations are usable for measuring the filling material level in vessels. Some of these methods are disclosed in U.S. Pat. Nos. 5,877,997, 5,793,704, 6,122,602, 5,822,275, 5,699,151, 6,128,982 and 5,892,576 and illustrate the wave-train-based invasive approaches to the vessel's filling material level measurement.

With regard to non-invasive methods for the level measurement, the following popular approaches are known:
Radioactive
Capacitive
Ultrasound
Gravitational Radioactive methods are based on the fact that radioactive energy attenuates after passing through a vessel's walls and through filling material. Obviously, radioactive systems are dependent on the vessel's material and the filling material. These systems are not capable of continuous level measurement and these systems require special design and operational efforts to maintain a sufficient degree of safety. The example of a radioactive system usable for a set point level measurement is Radiometric Measuring System DG57 manufactured by Endress+Hauser.

Gravitational systems require the exact knowledge of the empty vessel's weight and its dimensions including the internal dimensions. Gravitational systems are limited in their applicability due to problems with installation of the weight-measuring equipment and calculation of the actual level of filling material, which varies depending on the vessel's internal topology, mechanical properties of the filling material and environmental conditions, e.g., material viscosity or temperature. Vishay Nobel of Sweden manufactures one such gravitational system.

Non-invasive capacitive methods for the material level measurement in vessels are subject to a very strong limitation.

In order to obtain satisfactory measurement resolution, the distance between the conductive elements of a sensing capacitor must be substantially smaller than their area. In fact, the capacitance of two parallel rectangular plates taken into the first approximation analysis is described by a well-known formula:

$$C = \frac{k\varepsilon_o A}{d} \quad (1)$$

wherein, C denotes the capacitance; $\varepsilon_o$—electric constant; k—relative permittivity; A—area of a flat rectangular conductive element; and d—distance between the conductive elements. Note that all mathematical notations in this patent application are standard (refer to www.mathworld.wolfram.com). Given that d=0.01 m, A=1.00 m$^2$, k=2.5 (typical value for dielectric materials), C=2.5·8.85·10$^{-12}$·1.00/0.01=22.125·10$^{-4}$ µF. A 10% change in the area of the conductive plates results in a 221.25 pF change in the capacitance. This value is comparable with the capacitance of wiring for a printed circuit board. Thus, the non-invasive capacitive method for level measurement is only practically applicable to very small vessels with dielectric filling material. For the same reason, in applications with electro-conductive filling material, the non-invasive capacitive methods are only feasible for vessels with relatively thin non-conductive walls. Therefore, non-invasive capacitive methods for the filling material level measurement in vessels have a narrow field of application. U.S. Pat. Nos. 6,448,782 and 6,472,887 offer a detailed description of devices utilizing the non-invasive capacitive method for filling material level measurement in vessels; the former is for electro-conductive filling material, and the later is for dielectric filling material.

Ultrasound non-invasive methods for level measurement require the attachment of one or more transducers to the external wall of a vessel for transmitting the acoustic energy toward the boundary surface separating the filling material from the remaining space inside of the vessel. The receiver of the measuring system gets the reflected ultrasound wave train and sends it to the device's echo processing electronics. Thus, with the exception of the external attachment of the transducers, these methods bear all the distinctions of well-known invasive ultrasound methods for the distance/level measurement. However, the ultrasound non-invasive method is advantageous because of its non-invasiveness. At the same time, the ultrasound non-invasive approach to the filling material level measurement is limited by the homogeneity of the filling material. Typically, measuring systems of this method are used for homogeneous liquid filling materials. It is not applicable to loose materials or liquids with inclusions. In addition, this method is not applicable to relatively small-sized containers due to problems with acoustic pulse relaxation, reverberation and the size of transducers. Plus, the method is temperature-dependent, thereby requiring temperature compensation during measurement. If used for the set-point level measurement or material presence detection, the method is prone to creating false alarms due to the effect of some volume of a viscous filling material adhering to the internal surface of the container. Finally, the ultrasound-based non-invasive technologies require special treatment of the container's surface in order to create a conduit for ultrasound waves emitted by a transducer into the container. An example of such technology is VesselCheck ST and SpotCheck of Cannongate Technology, UK. The VesselCheck marketing material published on www.cannongatetechnology.co.uk says: "With VesselCheck ST, there's no need to make holes in the vessel. The unique VesselCheck ST provides continuous measurement with no process connections, meaning no down-time during installation. Two small ultrasonic transducers are clamped to the outside walls of the vessel. One is mounted on the bottom of the vessel and the other on the side, to compensate for variations in temperature and density." "SpotCheck uses an ultrasonic "footprint" to determine the presence or absence of liquid inside a tank or pipe.... In order to insure that SpotCheck will operate satisfactorily, the surface of the tank or pipe must be prepared correctly." For instance, deseaming and gelling the wall's surface is required in the area in which the transducer is mounted.

A similar approach has been announced by HiTECH Technologies, Inc., USA. This company markets continuous and set point devices based on their Penetrating Pulse Technology (PPT) [Online article: "*Penetrating Pulse Technology*," at www.hightechtech.com], which resembles the method developed by Cannongate Technology, Ltd., UK. The distinctive feature of PPT is generating a single short ultrasound impulse penetrating the vessel's wall toward the filling material. The HiTECH Technologies-developed SONOMETER for the continuous level measurement and SONOCONTROL for the set point level measurement are based on PPT. The company provides a comprehensive description of their method on the website www.hitechtech.com. An analysis of PPT methods shows that the technology is ultrasound and uses either the Pulse Transit Time paradigm or the monitoring of the duration of ultrasound waves' relaxation to indicate the material presence in the plane in which the special acoustical transducer is installed on the outside wall of the vessel. The PPT are subject to all of the above-described limitations of the ultrasound methods of the level measurement.

An analysis of the related art shows that all known invasive or non-invasive level measurement techniques are limited by the factors of vessel's material, filling material and environment. See also: Burdik V. *Analysis of Sonar Systems*. L., 1988; Skoochik E. *Fundamentals of Acoustics*. M., 1976; and Krasilnikov V. A., Krylov V. V. *Introduction to Physical Acoustics*. M., 1984.

The object of the present invention is to develop a method for the non-invasive measurement of the filling material level in the vessel free of the underlined limitations.

SUMMARY OF THE INVENTION

A method for non-invasive evaluation of the level of filling material in a vessel is disclosed. The method may include the steps of initializing mechanical oscillation at least in a single predetermined point on the outside wall of the vessel; performing a Close Range Level Measurement Procedure (CRMP); performing a Long Range Level Measurement Procedure (LRMP); analyzing the outcome of the CRMP; analyzing the outcome of the LRMP; and evaluating the value of the filling material level in the vessel based on the result of the analysis of the CRMP and the LRMP outcomes.

The method for evaluating the value of the filling material level may include one of continuous measurement of the level of the filling material in the vessel, continuous monitoring the deviation of the level of the filling material in the vessel from a set point level, set point measurement of the level of the filling material in the vessel, filling material presence detection in the vessel and switching based on the level of the filling material.

The method may include joint performance of the CRMP and the LRMP for the filling material level evaluation having one or more points for the mechanical oscillation initiation on the external surface of the vessel.

The method may include joint performance of the CRMP and the LRMP for the filling material level evaluation having one or more points for receiving a mechanical oscillation on the external surface of the vessel.

The method may include measuring the value of the filling material level in the vessel based on the analysis of the outcome of the CRMP when the presence of the filling material in the vicinity of the point of mechanical oscillation initiation is known.

The method may include monitoring a deviation of the level of filling material in the vicinity of the point of mechanical oscillation initiation based on the analysis of the outcome of the CRMP.

The method may include evaluating the value of the filling material set point level in the vessel based on the analysis of the outcome of the CRMP.

The method may include performing the filling material level switching in the vessel based on the analysis of the outcome of the CRMP.

The method may include performing the filling material presence detection in the vessel based on the analysis of the outcome of the CRMP.

The method may include measuring the value of the filling material level in the vessel based on the analysis of the outcome of the LRMP when the filling material level is not in the vicinity of the point of the mechanical oscillation initiation.

The method may include having the point of the mechanical oscillation initiation and a point of a mechanical oscillation receiving both located at one of the top of the vessel and the bottom of the vessel.

The method may include having the mechanical oscillation originate through a temporal mechanical load applied to an external surface of the wall of the vessel, the load being actuated by one of a solid material body percussion, an air-dynamic percussion, a fluid-dynamic percussion, a ballistic percussion and an electro-dynamic percussion; and a time diagram of the mechanical load having a form of one of a single pulse, a trainload of pulses and a continuous periodical load.

The method may include having the time diagram being a function of a modulation of the load, the modulation being one of an amplitude modulation, a frequency modulation, a phase modulation, a pulse-code modulation, a pulse-width modulation and a combination thereof, and the mechanical load being originated by the transformation of a source of driving energy selected from one of a solenoid drive, a mechanical energy used in springs, a pneumatic apparatus, a hydraulic apparatus, and a ballistic percussive apparatus.

The method may include having the CRMP analyse the mechanical oscillation obtained in at least one receiving point, the LRMP analyse the mechanical oscillation obtained in at least one receiving point, the outcome of the CRMP being stored for consequent analysis, and the outcome of the LRMP being stored for consequent analysis.

The method may include capturing the mechanical oscillation on the external surface of the wall of the vessel by the attachment of oscillation sensing means at the point of mechanical oscillation receiving.

The method may include capturing the mechanical oscillation on the external surface of the wall of the vessel by using remote oscillation sensing means at the point of mechanical oscillation receiving.

The method may include having the outcome of the CRMP include a variable or a vector of variables that allow a decision on the validity of the CRMP; the outcome of the LRMP include a variable or a vector of variables that allow a decision on the validity of the LRMP; the CRMP-relating variables include a vector denoted $\psi_C$, and the LRMP-relating variables include a vector denoted $\psi_L$.

The method may include producing evaluating binary variables of the time domain, denoted $\xi_1$ and $\xi_2$, with the variable $\xi_1$ indicating the presence or the absence of the filling material in the vicinity of the point of mechanical oscillation initiation and with the variable $\xi_2$ indicating that the LRMP generates a valid or an invalid outcome.

The method may include using the vector $\psi_C$ for the production of the variable $\xi_1$ and using the vector $\psi_L$ for the production of the variable $\xi_2$.

The method may include having the vector $\psi_C$ include a function of amplitudes of mechanical oscillation obtained at the point of the mechanical oscillation receiving, the function being defined on a predetermined time interval and the vector $\psi_C$ include a function of the number of periods of mechanical oscillation obtained at the point of the mechanical oscillation receiving, and the function being defined on the time interval.

The method may include having the CRMP control the LRMP by providing information on the presence or absence of the filling material in the vicinity of at least one predetermined point of mechanical oscillation initiation.

The method may include having the value of the filling material level in the vessel calculated by the formulas:

$$\xi_1=0 \& \xi_2=0 \Rightarrow y=f(y_L)$$

$$\xi_1=1 \Rightarrow y=f(y_C)$$

$$L_{fm}=H-y,$$

wherein $\xi_1=0$ indicates that the filling material is beyond the vicinity of the point of mechanical oscillation initiation, $\xi_1=1$ indicates that the filling material is within the vicinity of the point of mechanical oscillation initiation, $\xi_2=0$ indicates that the LRMP produces a valid outcome, $\xi_2=1$ indicates that the LRMP produces an invalid outcome, y denotes the distance between a point of mechanical oscillation initiation and a filling material interface in the vessel; $y_L$ denotes a level-related output of the LRMP; $y_C$ denotes a level-related output of the CRMP; $L_{fm}$ denotes the level of filling material in the vessel; and H denotes a known height of the point of mechanical oscillation initiation.

The method may include performing the CRMP by executing two operations wherein the first operation is an operation Calibration and the second operation is an operation Measurement.

The method may include having the operation Calibration include the steps of positioning a point of mechanical oscillation initiation above a vicinity of the material interface in the vessel; obtaining a statistical sample of the output of the CRMP by repetitively performing a Basic Measurement Procedure (BMP); deriving a value, denoted $\psi_1$, of an evaluating variable, denoted $\psi$, from the statistical sample that is associated with an upper saturation state of a measuring system's static transfer operator; positioning the point of mechanical oscillation initiation below the vicinity of the filling material interface in the vessel; obtaining a statistical sample of the output of the CRMP by repetitively performing the BMP; and deriving a value, denoted $\psi_2$, of the evaluating variable $\psi$, from a statistical sample that is associated with a lower saturation state of the measuring system's static transfer operator.

The method may further include incrementally shifting the position of the point of mechanical oscillation initiation toward the filling material interface in the vessel; repeating the steps disclosed in the claim 24 after each change in the position of the point of mechanical oscillation initiation is performed and storing the latest values of the evaluating variable $\psi=\psi_1$ and the distance $y=y_1$ between the point of mechanical oscillation initiation and the filling material interface if the beginning position of the point of mechanical oscillation initiation was above the vicinity of the filling material interface in the vessel and storing the latest values evaluating variable $\psi=\psi_2$ and the distance $y=y_2$ between the point of mechanical oscillation initiation and the filling material interface if the beginning position of the point of mechanical oscillation initiation was below the vicinity of the filling material interface in the vessel; and calculating parameters of a non-saturated linear static transfer operator of the measuring system by the formulas:

$$K = \frac{\psi_1 - \psi_2}{y_{1min} - y_{2min}}$$

$$\psi^0 = \frac{(y_{1min} - y_{2min})\psi_2 - y_{2min}(\psi_1 - \psi_2)}{y_{1min} - y_{2min}}$$

wherein, K denotes a slope, $\psi^0$ denotes an intercept of the measuring system's static linear transfer operator, $y_{1min}$ denotes the minimal value $y_1$ obtained on the condition of the predetermined proximity between the two consequent readings of $\psi_1$, and $y_{2min}$ denotes the minimal value $y_2$ obtained on the condition of the predetermined proximity between the two consequent readings of $\psi_2$.

The operation Calibration may include the steps of positioning a point of mechanical oscillation initiation below a vicinity of the material interface in the vessel; obtaining a statistical sample of the output of the CRMP by repetitively performing a Basic Measurement Procedure (BMP); deriving a value, denoted $\psi_1$, of an evaluating variable, denoted $\psi$, from the statistical sample that is associated with an lower saturation state of a measuring system's static transfer operator; positioning the point of mechanical oscillation initiation above the vicinity of the filling material interface in the vessel; obtaining a statistical sample of the output of the CRMP by repetitively performing the BMP; and deriving a value, denoted $\psi_2$, of the evaluating variable $\psi$, from a statistical sample that is associated with a lower saturation state of the measuring system's static transfer operator.

The method may include having the operation Calibration include the steps of positioning a point of mechanical oscillation receiving above a vicinity of the point of mechanical oscillation initiation; obtaining a statistical sample of the output of the CRMP by repetitively performing a Basic Measurement Procedure (BMP); deriving a value $\psi_1$ from a statistical sample that is associated with an upper saturation state of a measuring system's static transfer operator; and calculating a value $\psi_2$, of an evaluating variable $\psi$ by the application of a formula $\psi_2=f(\psi_1)$, wherein, the simplest expression for $f(\psi_1)$ is $f(\psi_1)=\psi_1+\delta_1$; $\psi_2$ is associated with a lower saturation state of the measuring system's static transfer operator, wherein $\delta_1 \in \Re$—a real number.

The method may include having the operation Calibration include the steps of positioning a point of mechanical oscillation receiving below a vicinity of the point of mechanical oscillation initiation; obtaining a statistical sample of the output of the CRMP by repetitively performing BMP; deriving a value $\psi_2$ from the statistical sample that is associated with the lower saturation state of the measuring system's static transfer operator; and calculating a value $\psi_1$, of an evaluating variable $\psi$ by the application of a formula $\psi_1=\phi(\psi_2)$, wherein, the simplest expression for $\phi(\psi_2)$ is $\phi(\psi_2)=\psi_2+\delta_2$; $\psi_1$ is associated with the upper saturation state of the measuring system's static transfer operator, wherein $\delta_2 \in \Re$—real number.

The method may include positioning a first point of mechanical oscillation receiving above a vicinity of the point of mechanical oscillation initiation; positioning a second point of mechanical oscillation receiving below the vicinity of the point of mechanical oscillation initiation; obtaining a statistical sample of the output of the CRMP by repetitively performing a Basic Measurement Procedure (BMP) in the first point of mechanical oscillation receiving and the second point of mechanical oscillation receiving; deriving an evaluating variable from a statistical sample obtained in the first point of mechanical oscillation receiving; deriving an evaluating variable from a statistical sample obtained in the second point of mechanical oscillation receiving; calculating values $\psi_1$, $\psi_2$ of a measuring system's upper and lower saturation states of a measuring system's static transfer operator according to the following formulas:

$$\forall j=(1,2): \Delta\psi_j = \psi_j(t_i) - \psi_j(t_{i-1})$$

$$|\Delta\psi_j - \Delta\psi_j^*| < \in_j \Rightarrow \psi_j = \psi_j(t_i)$$

wherein, j=1 denotes the first point of mechanical oscillation receiving, j=2 denotes the second point of mechanical oscillation receiving, i denotes the moment in time the statistical sample was obtained, and $\psi_j$ denotes the evaluating variable corresponding with the j-th position of the point of mechanical oscillation receiving; and calculating parameters of a non-saturated linear static transfer operator of the measuring system by the formulas:

$$K = \frac{\psi_1 - \psi_2}{y_1 - y_2}$$

$$\psi^0 = \frac{(y_1 - y_2)\psi_2 - y_2(\psi_1 - \psi_2)}{y_1 - y_2}$$

wherein, K denotes a slope, $\psi^0$ denotes an intercept of the measuring system's static linear transfer operator, $y_1$ denotes a distance between the receiver and the lower point of saturation of the measuring system's static transfer operator, and $y_2$ denotes a distance between the receiver and the upper point of saturation of the measuring system's static transfer operator.

The method may include setting parameters of a transfer operator of a measuring system, the parameters selected from one of $\psi_1$, $\psi_2$, $y_1$, $y_2$, K, $\psi^0$ and a combination thereof.

The method may include having the operation Measurement include the steps of performing a Basic Measurement Procedure (BMP), which output is a value of an evaluating variable $\psi(t)$ and calculating the value of the level of filling material in the vessel by the formulas:

$$\Delta y(t) = K^{-1}[\psi(t) - \psi^0]$$

$$L_{fm} = f[y_a, \Delta y(t)]$$

wherein, $\Delta y(t)$ denotes a calculated distance between a filling material interface and a point of mechanical oscillation initiation, vector $y_a$ denotes coordinates of the point of mechanical oscillation initiation positioned on the vessel, and $L_{fm}$ denotes the level of filling material in the vessel.

The method may include calculating the value of the level of filling material by the formula:

$$L_{fm} = H^* \pm \Delta y(t)$$

wherein, H* denotes a known distance between the point of mechanical oscillation initiation and the bottom of the vessel, and the arithmetic operator "+" is used if the level of filling material is greater or equal then H* and the arithmetic operator "−" is used if the level of filling material is lower then H*.

The method may include having a Basic Measurement Procedure (BMP) include the steps of: initiating the mechanical oscillation by the application of a mechanical load non-tangentially aimed toward the vessel's external wall; capturing the moment in time of the mechanical oscillation initiation; receiving a mechanical oscillation that occurs on an outside surface of the wall of the vessel due to the mechanical oscillation initiation; obtaining parameters of the mechanical oscillation including amplitudes and frequencies corresponding with at least some periods of the captured oscillating process; and calculating a value of an evaluating variable denoted $\psi$ by using the parameters of the mechanical oscillation as an input.

The method may include monitoring the parameters of the mechanical oscillation; storing the parameter values at each moment in time the operation Calibration is committed; comparing the monitored values of the parameters of the mechanical oscillation with the stored values of the parameters; establishing a vector, denoted as the Proximity Vector, of values reflecting the proximity between the monitored values and the stored values of the parameters of the mechanical oscillation; and executing the operation Calibration when components of the Proximity Vector indicate that the values of the monitored parameters of the mechanical oscillation are beyond a predetermined degree of proximity between the values of the monitored parameters of the mechanical oscillation and the stored values of the parameters of the mechanical oscillation.

The method may include performing the BMP more than once for the purpose of improvement of the validity of measurement.

The method may include calculating the evaluating variable's value by the formula:

$$\{\forall A_i \in [A_1, A_2], i = \overline{1,n}\} \,\&\, t > t_0 \Rightarrow \psi(t) = n^{-1} \sum_{i=1}^{i=n} f_i$$

wherein, $[A_1, A_2]$ denotes a predetermined amplitude range satisfying a criterion of undisturbed mechanical oscillation processing, n denotes the number of mechanical oscillation frequencies $f_i$ determined on a condition that $\forall A_i \in [A_1, A_2]$, $i=\overline{1,n}$, & $t>t_0$, $t_0$ denotes the moment of time when the load has been applied.

The method may include calculating the evaluating variable's value by the formula:

$$\{\forall \omega_i \in [\omega_1, \omega_2], i = \overline{1,m}\} \,\&\, t > t_0 \Rightarrow \psi(t) = \sum_{i=1}^{i=m} \sin(T_i)\bigg|_{A_i \in [A_1, A_2]}$$

wherein, $[\omega_1, \omega_2]$ denotes a frequency range satisfying a criterion of non-generation of mechanical elastic waves, $T_i$ denotes an i-th full period of oscillation observed beginning at a moment $t_0$.

The method may include providing for a high repeatability and high accuracy of measurement, and further including:

$$\psi(t) = q^{-1} \sum_{i=1}^{i=q} b_i \psi_i(t)$$

wherein, $\psi_i(t)$ denotes the evaluating variable obtained by an i-th execution of the BMP, and $b_i$ denotes a weighting factor corresponding with the i-th execution of the BMP.

The method may include evaluating variable $\psi_i(t)$ as one of a function of amplitudes of mechanical oscillation obtained at the point of the mechanical oscillation receiving over a predetermined time interval, a function of the number of periods of mechanical oscillation obtained at the point of the mechanical oscillation receiving over a predetermined time interval, and a function of the presence or absence of the filling material in the vicinity of a predetermined point of mechanical oscillation initiation.

The method may include monitoring mechanical oscillations in at least two different points on the surface of the vessel, wherein these points are consequently denoted $p_1$, $p_2, \ldots, p_r$ with the r denoting the number of the points; and forming the evaluating variable $\psi(t)$ based on the output from each point for mechanical oscillation receiving.

The method may include providing two points for mechanical oscillation receiving and further include calculating the evaluating variable $\psi(t)$ by the following formulas:

$$y_{p1}(t_i) = K^{-1}[\psi_{p1}(t) - \psi^0]$$

$$y_{p2}(t_i) = K^{-1}[\psi_{p2}(t) - \psi^0]$$

$$y_{p1}(t_i) - y_{p2}(t_i) = \text{const} \Leftrightarrow \psi(t) = f[\psi_{p1}(t), \psi_{p2}(t)]$$

wherein, $y_{p1}$, $y_{p2}$ denote a distance from each point $p_1$, $p_2$ to a filling material interface.

The method may include applying a series of mechanical loads to the vessel's external wall per each measurement such that each application of the mechanical load is a percussion; generating the evaluating variable per each percussion in the series; validating each percussion-associated evaluating variable such that each evaluating variable is considered either valid or invalid; creating an array of the valid evaluating variables per each series of percussions; selecting those arrays that have a length greater or equal to a predetermined number; statistically treating each array for the purpose of determination of the presence or the absence of the filling material in the vicinity of the point for mechanical oscillation initiation; forming a binary status variable of the discrete time domain, denoted s(t), that indicates the presence or absence of the filling material in the vicinity of the point for mechanical oscillation initiating; and including the status variable into a vector-output of the CRMP.

The method may include statistically processing each array of valid evaluating variables by an application of a Major Algorithm.

The method may include forming the binary status variable by the formulas:

$$\forall t_i, i = \overline{1,r}:$$

$$\psi(t_i) \in \psi_{valid} \Rightarrow y(t_i) = K^{-1}[\psi(t_i) - \psi^0]$$

$$s(t) = F[\psi(t_1), \psi(t_2), \ldots, \psi(t_r), t]$$

wherein, F[ ] denotes a function of the evaluating variables.

The method may include calculating the function F[ ] according to the formula:

$$F[\psi(t_1), \psi(t_2), \ldots, \psi(t_r), t] = r^{-1} \sum_{i=1}^{i=r} \psi(t_i).$$

The method may include performing a set-point level measurement by means of the CRMP with a modified operation Measurement.

The method may include having the modified operation Measurement include the following steps: performing a Basic Measurement Procedure (BMP), which output is the value of an evaluating variable $\psi(t)$ obtained at the moment of time the BMP has been committed; and calculating a status variable $s(t)$ relating to the level of filling material in the vessel by the following formulas:

$\forall \psi(t) > 0, \exists s(t):$ $\psi(t) - \psi_{1s} > 0 \Rightarrow s(t) =$ "Filling material is below the level set point"

$\psi(t) - \psi_{2s} < 0 \Rightarrow s(t) =$ "Filling material is above the level set point"

wherein, the parameters denoted $\psi_{1s}$, $\psi_{2s}$ define a dead zone of the set-point measurement.

The method may include having the dead zone parameters $\psi_{1s}$ and $\psi_{2s}$ being functions of saturation points $\psi_1$ and $\psi_2$.

The method may include associating a value denoted $\psi'_s$ of an evaluating variable with a known value of a binary status variable; calculating a value denoted $\psi''_s$ of the evaluating variable that is associated with the opposite binary outcome of the status variable such that $s(\psi''_s) = \neg s(\psi'_s)$; storing the values $\psi'_s$ and $\psi''_s$ for further use in the operation Measurement in the set point level measurement applications and for a material presence detection in the vicinity of the level set point and in level switching applications; and updating the values $\psi'_s$ and $\psi''_s$ according to a schedule of execution of the BMP.

The method may include applying the CRMP to more than one point on the external wall of the vessel and executing a repetitive CRMP (RCRMP), such that the level of the filling material is measured at several points.

The method may further include locating a plurality of points along a vertical axis on the external wall of the vessel; applying a Basic Measurement Procedure (BMP) sequentially to each point of the plurality of points beginning from a starting position on the vessel's external wall toward an ending position on the vessel's external wall until the following condition is satisfied:

$\exists j \in [1, m] \subseteq \aleph : \psi_j(t) \in (\psi^*_1, \psi^*_2) \Rightarrow \psi(t) = \psi_j(t),$ wherein, $\psi_j(t)$ denotes an evaluating variable for a j-th execution of the BMP; $\psi^*_1$, $\psi^*_2$ and $K^*$ respectively denote upper and lower saturation points and a gain factor of an aggregated transfer operator of a distributed measuring system or device; and calculating the level by the following formulas:

$y^* = (\psi^*_1 - \psi^*_2)/K^*$ $y_j(t) = [\psi(t) - \psi^0]/K^*$ $y(t) = (j-1)y^* \pm y_j(t)$ $L_{fm} = H - y(t) \Rightarrow$ starting position is in the upper half of vessel $L_{fm} = y(t) \Rightarrow$ starting position is in the lower half of vessel wherein, y* denotes a spread distance corresponding with a linear part of the distributed measuring system's transfer operator; H denotes a height of the starting position, and the "+" in the "±" sign is for a starting point located in a lower half of the vessel and the "−" in the "±" sign is for a starting point located in an upper half of the vessel.

The method may include locating a plurality of points along a vertical axis on the external wall of the vessel; applying a Basic Measurement Procedure (BMP) simultaneously to at least two points of the plurality of points beginning from a starting position on the vessel's external wall toward an ending position on the vessel's external wall and detecting the ordering number of the point, for which the following condition is satisfied:

$\exists j \in [1, m] \subseteq \aleph : \psi_j(t) \in (\psi^*_1, \psi^*_2) \Rightarrow \psi(t) = \psi_j(t);$ and calculating the evaluating variable's value by the formula:

$$\{\forall \omega_i \in [\omega_1, \omega_2], i = \overline{1, m}\} \ \& \ t > t_0 \Rightarrow \psi(t) = \sum_{i=1}^{i=m} \sin(T_i) \bigg|_{A_i \in [A_1, A_2]}$$

wherein, $[\omega_1, \omega_2]$ denotes a frequency range satisfying a criterion of non-generation of mechanical elastic waves, $T_i$ denotes an i-th full period of oscillation observed beginning at a moment $t_0$.

For applications with a multi-layer structure of the filling material, having layers of a different density, to measure dimensions of each layer of the multi-layer structure in the vessel, the method may include applying a repetitive CRMP (RCRMP).

The method may include, prior to initializing the mechanical oscillation, mounting elements on the vessel's wall for setting boundary conditions for mechanical oscillation-induced elastic waves propagating in the vessel, to define a linear part of a level measurement system's static transfer operator.

The method may include receiving at least one acoustical signal originated by an application of at least one percussion within a sequence of operations of a Basic Measurement Procedure (BMP) and calculating an evaluating variable resulting from the BMP using a measured mechanical oscillation and a measured acoustical signal associated with the mechanical oscillation.

The method may include performing the LRMP by executing two operations wherein the first operation is an operation of calibration and the second operation is an operation of measurement.

The operation of calibration for the LRMP may include the steps of: setting an initial value of the filling material level in the vessel; non-tangentially applying the mechanical oscillation to the vessel's external wall at a predetermined point to initiate a transverse wave; capturing an occurrence of the transverse wave at a predetermined transverse wave receiving point; and measuring and storing the value of a time interval denoted $\Delta T^*$ between the moment of the transverse wave initiation and the moment of the wave occurrence capturing, such that the time interval $\Delta T^*$ is associated with a distance between the point of transverse wave initiation and the filling material interface, denoted y*.

The operation of measurement for the LRMP may include the steps of: non-tangentially applying the mechanical oscillation to the vessel's external wall at a point of a transverse wave initiation; capturing an occurrence of the transverse wave at a predetermined transverse wave receiving point; measuring and storing a value of a time interval denoted $\Delta T$ between the moment of the transverse wave initiation and the moment of the wave occurrence capturing, such that the time interval $\Delta T$ is associated with a distance between the point of transverse wave initiation and the filling material interface, denoted y; and calculating the measured level denoted $L_{fm}$, by the formulas:

$$y = \frac{\Delta T}{\Delta T^*} \cdot y^*$$

$$L_{fm} = H - y - d$$

wherein, d denotes a known distance between a top of the vessel and the point of transverse wave initiation.

Performing the LRMP may include the steps of: arranging for monitoring a presence of a transverse wave at a plurality of receiving points on the external wall of the vessel to compensate for possible variations in propagation speed of the monitored waves through the material of the vessel's wall; non-tangentially applying the mechanical oscillation to the vessel's external wall at the point of a transverse wave initiation; capturing the transverse wave's presence at each wave's receiving point of the plurality of points; measuring and storing each value of a time interval denoted $\Delta T_i$ between a moment of the transverse wave initiation and a moment of the wave capturing at an i-th point of the plurality of points, such that each time interval $\Delta T_i$ is associated with a distance between the i-th receiving point and the filling material interface, denoted $y_i$; and calculating the level by solving the following system of algebraic equations of the order m:

$$F(L_{fm}, H, \Delta T, d) = 0$$

wherein, $L_{fm}$ denotes the level of filling material in the vessel; H denotes a height of the vessel; $\Delta T$ denotes a vector of time intervals between the moment of the transverse wave initiation and the moment the wave capturing at the i-th point of the plurality of points; d denotes a known distance between a top of the vessel and the point of transverse wave initiation; m denotes the number of the transverse wave receiving points.

The method may include calculating the measured level by the following formulas:

$$y = \frac{\Delta T}{\Delta T^*} \cdot \overline{y^*}$$

$$\overline{y^*} = n^{-1} \sum_{i=1}^{i=n} \overline{y_i^*}$$

$$\Delta T^* = n^{-1} \sum_{i=1}^{i=n} \overline{\Delta T_i^*}$$

$$L_{fm} = H - y - d$$

wherein, $\overline{y}^*$ and $\Delta T^*$ denote an aggregated calibrating distance and an aggregated calibrating wave travel time obtained by monitoring the wave's responses captured at n receiving points of the plurality of the transverse wave receiving points and $\Delta T$ represents the transverse wave's travel time along the wall of the vessel.

The method may include having an evaluating variable $\psi_L \in \psi_L$ generated by the LRMP include a variable $\Delta T$, representing the transverse wave's travel time along the wall of the vessel, the evaluating variable $\psi_L$ being a function of the variable $\Delta T$, such that $\psi_L = F(\Delta T)$, and a filtering or aggregation or statistical processing is applied to obtain the evaluating variable for the LRMP.

The method may include calculating the variable $\Delta T$ by the formula:

$$\Delta T = m^{-1} \sum_{j=1}^{j=m} \Delta T_j$$

wherein, $\Delta T_j$ denotes a travel time obtained at j-th measurement in the series of m measurements.

The method may also include providing a first impact load at a predetermined load point on an external wall of the vessel to initialize a first oscillation in the wall of the vessel and in the filling material in the vessel; receiving a measure of the first oscillation at a first predetermined receiving point; analyzing the measure of the first oscillation received at the first predetermined receiving point to determine a first evaluating variable; and determining a level of the filling material in the vessel based on the first evaluating variable These and other objects, features and advantages of the present invention will become apparent in light of the drawings and detailed description of various embodiments of the present invention provided below.

DETAILED DESCRIPTION OF THE PREFERRED EMBODIMENTS

Figure 1A:
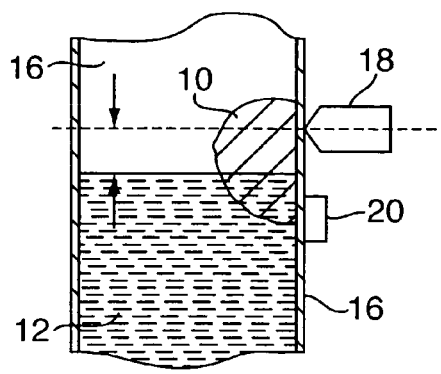
FIG. 1a is a schematic of the method implementing system of one embodiment of the present invention with in-plane positioning of the striker and the receiver and with the filling material interface below the center of impact.

The method of the present invention is based on monitoring the oscillatory motion of the vessel's outside wall; such motion, for example, being initiated by the application of a mechanical load directed at the wall.

In one aspect, the method utilizes a Close Range Level Measuring Procedure (CRMP) to non-invasively measure the level of the filling material within a vessel. CRMP exploits the properties of the mechanical dynamic system that includes the wall of the vessel and the filling material near the load point. At a relatively short distance between the load point and the filling material's interface, the oscillation of the mechanical dynamic system, i.e. the "instantaneous associate filling material mass and the instantaneous associate vessel's wall(s) mass," is used to obtain the level of the filling material measurement.

In another aspect, the method utilizes a Long Range Level Measuring Procedure (LRMP) to measure the level of the filling material. LRMP exploits an elastic waves-based approach for the distance measurement.

In even another aspect, the method of the present invention provides for automatically switching from the CRMP output to the LRMP output, and vise versa, while producing the measurement. The decision on which procedure's output contributes to a valid level reading depends on a joint evaluation of the output of CRMP and the output of LRMP. The developed method may be a sequence of the following steps:

1. initializing vibration at least a single predetermined position on the vessel's outside wall;
2. substantially simultaneously performing CRMP and LRMP;
3. evaluating the output of CRMP and the output of LRMP; and
4. calculating the value of the filling material level in the vessel based on the result of the joint evaluation of the CRMP and LRMP outputs.

Below, each step of the proposed method is described in detail for the method's minimal version of a single source of vibration.

Step 1 includes initializing vibration at least a single predetermined position on the vessel's outside wall. The vibration may originate in the neighborhood of a mechanical impact with its center located on the outside wall of the vessel. The impact load's time diagram could be of various forms including a single pulse, a trainload of pulses or a continuous periodical load. Each impact load-type of Step 1 may utilize any kind of modulation, for example, Amplitude Modulation, Frequency Modulation, Pulse-Code Modulation or their combinations. The particular realization of the vibration-generating load depends on the method's measurement procedures (LRMP/CRMP). A mechanical impact at the wall could be originated by the application of any suitable energy source depending on the technical requirements of the particular measurement project. Examples of impact sources include, but are not limited to, a solenoid, a spring, a hydraulic and an air pressure-based drive.

Step 2 includes substantially simultaneously performing CRMP and LRMP. A mechanical vibration captured by the receiver of the measuring system is the input for CRMP and for LRMP. Each procedure executes independently. The output of CRMP and the output of LRMP are used jointly to determine the control variable of the method.

Step 3 includes evaluating the output of CRMP and the output of LRMP. The CRMP output and the LRMP output, which are used for the evaluation, could be a procedure-relating variable or a vector of variables that allow a decision on the sensitivity of the procedure to be made. Let the CRMP-relating variables compose a vector denoted $\psi_C$ and the LRMP-relating variables compose a vector denoted $\psi_L$. The evaluation of the outputs $\psi_C$ and $\psi_L$ includes the production of binary evaluating variables $\xi_1$ and $\xi_2$ such that:

$$\forall t \in [t_1, t_2], \exists \xi_1 \in \{0, 1\}, \xi_2 \in \{0, 1\}:$$

$$\psi_C \subset \Psi_{Ce} \Rightarrow \xi_1 = 0, \text{"Absent"}$$

$$\psi_C \subset \Psi_{Cf} \Rightarrow \xi_1 = 1, \text{"Present"}$$

$$\psi_L \subset \Psi_{Lv} \Rightarrow \xi_2 = 0, \text{"Valid reading"}$$

$$\psi_L \subset \Psi_{Ln} \Rightarrow \xi_2 = 1, \text{"Invalid reading"} \quad (2)$$

wherein, $\Psi_{ce}$, denotes the subset of the CRMP-relating vectors $\psi_C$ that are associated with the absence of the filling matter in the vicinity of the center of the impact; $\Psi_{cf}$ denotes the subset of the CRMP-relating vectors $\psi_C$ that are associated with the presence of the filling matter in the vicinity of the center of the impact; $\Psi_{Lv}$ denotes the subset of the LRMP-relating vectors $\psi_L$ that are associated with a valid distance measurement between the receiver and the filling material interface; $\Psi_{Ln}$ denotes the subset of the LRMP-relating vectors $\psi_L$ that are associated with an invalid distance measurement between the receiver and the filling material interface.

Step 4 includes calculating the value of the filling material level in the vessel based on the result of the joint evaluation of the CRMP and LRMP outputs. In order to calculate the value of the measured level, the method of the present invention requires knowledge of the distance between the receiver of vibration and the filling material interface; the distance being denoted y. Once the distance y is obtained, the level of the filling material, denoted $L_{fm}$, is derivable by the subtraction of this distance from the known height, denoted H, of the receiver's position on the vessel's wall. The distance y obtained by the execution of the CRMP is denoted $y_C$. The distance y obtained by the execution of the LRMP is denoted $y_L$. Based on the above definitions, the value of the filling material level in the vessel can be calculated as follows:

$$\xi_1 = 0 \ \& \ \xi_2 = 0 \Rightarrow y = y_L$$

$$\xi_1 = 1 \Rightarrow y = y_C$$

$$L_{fm} = H - y. \quad (3)$$

Close Range Level Measurement Procedure (CRMP)

The Close Range Level Measurement Procedure emerged from a study of dynamic macro processes in the Associate Filling Material Mass and Associate Vessel's Wall(s) Mass system conducted by the authors of the present invention. The term "Associate" reflects the observation that the amount of matter involved in the oscillating process following a mechanical impact to the vessel's wall is limited and that it depends on the mechanical energy dissipation in the space surrounding the center of the impact. The space surrounding the center of the impact includes the wall(s) of the vessel and the matter inside the vessel. Also, this space includes the body of any mechanical source of the impact and the body of a sensing element if the former is used in some method's application for the mechanical oscillation initiation and the latter is used in other method's application for the mechanical oscillation receiving by being attached to the outside wall of the vessel. It is not critical to the method of the present invention that the source of the impact has a mechanical origin. Also, it is not critical to the method of the present invention that the sensing element is attached to the wall of the vessel. However, for the sake of generalization, it will be further assumed that a time-dependent mechanical load is applied to the vessel's outside wall by a small moving body of mass $m_s$; such moving body being called a "Striker". Additionally, it will be assumed that the sensing element that receives the mechanical oscillations resulting from the impact is attached to the vessel's external surface and that it has a mass $m_r$.

Figure 1B:
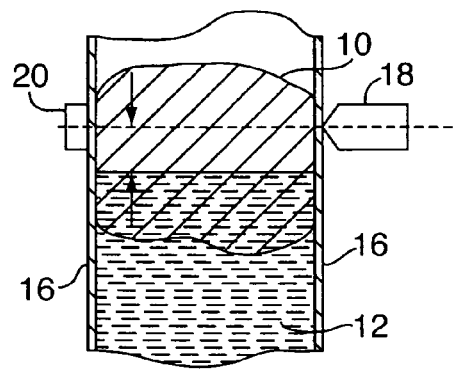
FIG. 1b is a schematic of the method implementing system of another embodiment of the present invention with coaxial positioning of the striker and the receiver.

A mechanical sketch of the studied system is shown in FIG. 1a and FIG. 1b. In FIG. 1a, a vessel 16 having a wall contains filling material 12. A striker 18 is shown contacting the external surface of the wall of the vessel. The striker has a mass, $m_s$. A receiver 20 is shown attached to the external surface of the wall of the vessel. The receiver has a mass, $m_r$. The effective associate mass of the matter that fills the excited space surrounding the center of impact of striker 18 is denoted as item 10. The center of the impact is denoted as a dashed line. The arrows denote the distance between the center of impact and the filling material interface. In FIG. 1b, receiver 20 is shown aligned with striker 18.

Figure 2:
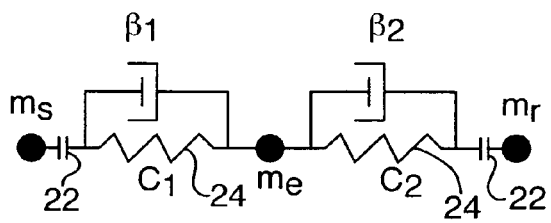
FIG. 2 depicts a simplified non-linear dynamic spring-mass model associated with the Close Range Level Measuring Procedure of the method of the present invention.

The system's simplified spring-mass model is presented in FIG. 2. In this model, $C_1$ denotes the stiffness of the leg between mass $m_s$ and mass $m_e$; $m_e$ denotes the associate effective mass of the matter that fills the excited space surrounding the center of the impact. The value of $m_e$ depends on the container's geometry, the density of the wall(s) and density of the matter inside the space involved in the oscillating process. The value of $m_e$ also depends on the amount of mechanical energy induced into the filling material through the wall. $C_2$ denotes the stiffness of the leg between mass $m_r$ and mass $m_e$. $\beta_1$ and $\beta_2$ denote damping coefficients in parallel with stiffnesses $C_1$ and $C_2$, respectively.

A substantial non-linearity of the model may arise, on one hand, by the possibility of losing a mechanical contact between the striker and the vessel's wall and, on the other hand, by the possibility of losing a mechanical contact between the vessel's wall and the receiver of mechanical oscillations. In addition, non-linearity may arise due to the violation of the mechanical medium continuity of the filling material itself, for example, a granulated material. The above-mentioned non-linearity is reflected in the spring-mass model of FIG. 2 in the form of two parallel lines, item 22, attached to the beginning end of each spring 24. The dimensions of the excited space and the energy relaxation property of the filling matter have a strong inverse relationship, such that the higher the mechanical energy dissipation of the filling material, the smaller the dimensions of the space involved in the mechanical oscillation. Another important observation is that the filling matter typically is comprised of two major components: gaseous and non-gaseous. In many industrial applications, the gaseous component is air and the non-gaseous component is fluid or loose/solid material with air-filled gaps between solid kernels. Examples of such loose material include cotton web or balls, PVC pellets or seeds.

Figure 3:
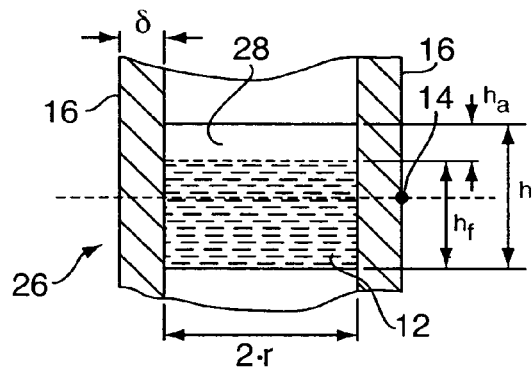
FIG. 3 shows a vertical section of a pipe partially filled with a material.

The amount of the oscillating matter within a container is associated with the center of the impact and it effectively depends on the level of the filling material and the type of the material. For example, consider the vessel 16 to be a pipe 26 of internal diameter 2·r and wall thickness δ; such a vessel is depicted in FIG. 3. FIG. 3 shows a vertical section of pipe 26 partially filled with a material 12 and air 28. The position of the center of impact 14 and all geometrical dimensions of the pipe and the filling material needed for the reasoning of the effective associated mass concept are shown on the drawing. An analysis of the dynamics of the mechanical system shown in FIG. 3 has led to the conclusion that the amount of oscillating matter within a container is associated with the center of the impact and that it effectively and non-ambiguously depends on the level of the filling material and the type of the filling material. The effective mass $m_e$ may be described by the following formulas:

$$m_e = m_w + m_a + m_f;$$

$$h_e = h_a + h_f;$$

$$m_w = \rho_w V_w, \quad V_w = \pi \delta h(2r + \delta);$$

$$m_a = \rho_a V_a(h_a);$$

$$m_f = \rho_f V_f(h_f); \quad (4)$$

wherein, $m_w$, $m_a$, and $m_f$ respectively denote the mass of the pipe's material, the mass of the air within the pipe relating to the impact-induced oscillating process and the mass of the filling material within the pipe relating to the impact-induced mechanical oscillating process; $V_w$, $V_a$ and $V_f$ respectively denote the volume of the pipe's material, the volume of the air within the pipe relating to the impact-induced oscillating process and the volume of the filling material within the pipe relating to the impact-induced mechanical oscillating process; $\rho_w$, $\rho_a$ and $\rho_f$ respectively denote the density of the pipe's material, the density of the air and the density of the filling material, which is considered homogeneous for the sake of simplicity of the method's disclosure; h denotes the height of the part of the pipe relating to the impact-induced oscillating process; $h_a$ denotes the part of the height h associated with the air within the pipe relating to the impact-induced oscillating process; $h_f$ denotes the part of the height h associated with the filling material within the pipe relating to the impact-induced oscillating process.

By taking into consideration that $m_a \ll m_f$, one can conclude that the effective associate mass $m_e$ is directly proportional to the height $h_f$. This reasoning supports the notion that the level of the filling material in the pipe or in any other vessel is measurable through the monitoring of mechanical oscillations originated by an impact to the vessel's wall if the filling material interface is positioned within the distance of $\pm h_e$ from the center of the impact.

The above-discussed example was MathCAD computed with the help of the 3-mass spring-mass model, shown in FIG. 2. The model's parameters were as follows:

Pipe material—fiberglass or steel
Diameter, internal—2.54 mm
Length—600 mm
Wall thickness—3 mm
Filling material—water The result of the modeling was evaluated using the ratio $\eta = \omega_1/\omega_2$ of the natural frequencies of a single pulse-load relaxation process obtained with an empty pipe ($\omega_1$) and a pipe filled with water ($\omega_2$). In this case, $\eta = 1.5$. A comparison of the modeled data with data obtained from our experiments with fiberglass and metal pipes of similar dimensions and under similar conditions, FIG. 1b, showed 12% proximity between both sets of data. The important observation from the modeling and from the experimental data was that the natural frequency-related evaluating variable was lower in the pipe filled with water than the empty pipe. The explanation to this phenomenon is based on the following reasoning. The mass $m_a$ of air involved in the pipe's transverse oscillating process following the mechanical impact, is several orders of magnitude smaller than the mass $m_{f1}$ of water occupying the space in the neighborhood of the center of the impact and participating in the oscillating process. Because fluid keeps mechanical contact with the walls of the fluid-holding vessel (under a no cavitation condition), the combined mass of the studied oscillating system with water will be higher than the mass of this system without water. This results in the reduction of the dominant frequency of the studied mechanical system.

Filling the pipe with a granulated material causes the opposite effect: the dominant frequency of the studied mechanical system rises relative to the dominant frequency of the excited empty pipe. The physical explanation of this observed phenomenon is complex and requires the analysis of the studied mechanical system under the conditions of a disruption of the mechanical medium and a high degree of mechanical energy dissipation typical in loose materials [Yavorski B. M., Detlaf A. A., *Physics Handbook*. Moscow, Nauka, 1990; *Earth's Crust Research: Geophysical Methods*; Overview: www.astronet.ru, Nov. 21, 2003; Olshevsky B. M. *Statistical Methods in Hydro Ranging*. L., 1983; Yakovlev A. H., Kablov G. P. *Short Range Sonars*. L., 1983; and Golubkov A. G. *Customized Sonar Systems*. L., 1987].

Due to a significant stiffness of the pipe's wall, a relatively small part of the pipe is involved in the oscillating process initiated by the impact. Accordingly, the value h, FIG. 3, delimits the space where the filling matter oscillates after the impact, thus the value of h limits the value of the effective mass $m_e$. When the pipe is filled with a granulated material, a certain amount of granules collide with the oscillating wall at every moment of existence of the oscillating process, thereby increasing the frequency and the logarithmic decrement of the observed mechanical oscillations on the outside surface of the vessel's wall. A number of the granules do not oscillate due to a high mutual friction between the granules creating an "Oscillon" phenomenon and reducing the effective oscillating space including the pipe walls and the filling material and increasing the frequency of oscillations, respectively. Besides this, the presence of the compressed granulated material in the vicinity of the impact makes that portion of the oscillating space immobile, thereby creating an effect of the rigid attachment that causes the mechanical system oscillate at higher frequencies. Thus, a combination of different physical processes in the oscillating system of the granulation-filled vessel causes a repeatable observable effect: an increase in the dominant frequency of the vessel's wall mechanical oscillations accompanied by a decrease in the dominant oscillation's logarithmic decrement.

The fact that the natural frequency of the excited pipe unambiguously depends on the type of filling material effectively improves the applicability of the method of the present invention.

The range of frequencies measured on the experimental installation depicted in FIG. 1*b*, lay within the interval 1200-2000 Hz. Due to the fact that all observations were made on multiple periods of the monitored signal, the presence of acoustical standing waves could be viewed as a possible alternative explanation to the observed phenomenon. However, by taking into account the average value of the speed of sound propagating through air, water and granulated materials [*Earth's Crust Research: Geophysical Methods*; Overview: www.astronet.ru, Nov. 21, 2003; and *Mark's Standard Handbook for Mechanical Engineers*, Tenth Edition. Eugene A. Avallone and Theodore Baumeister $3^{rd}$: McGraw-Hill, N.Y.], it was determined that the predicted value of the acoustical standing waves frequencies in our experimental installation do not fall within the above-identified interval [John William Strutt, the 3rd Baron Rayleigh. *The Theory of Sound*. M., 1955]:

$$f = c_m/2x$$

wherein $c_m$ denotes the speed of sound in the medium; and x denotes the distance to the first of the wave antinodes. With x=25.4 mm, the following acoustical standing wave frequencies were calculated:

Case 1: Pipe is empty.
$c_a$=331.8 m/s, f=6,531.5 Hz.

Case 2: Pipe filled with water.
$c_{fl}$=1461.0 m/s, f=28,759.8 Hz.

Case 3: Pipe filled with granulated material
$c_g$=500.0-1,000.0 m/s, f=9,842.5-19,685.1 Hz.

Figure 4:
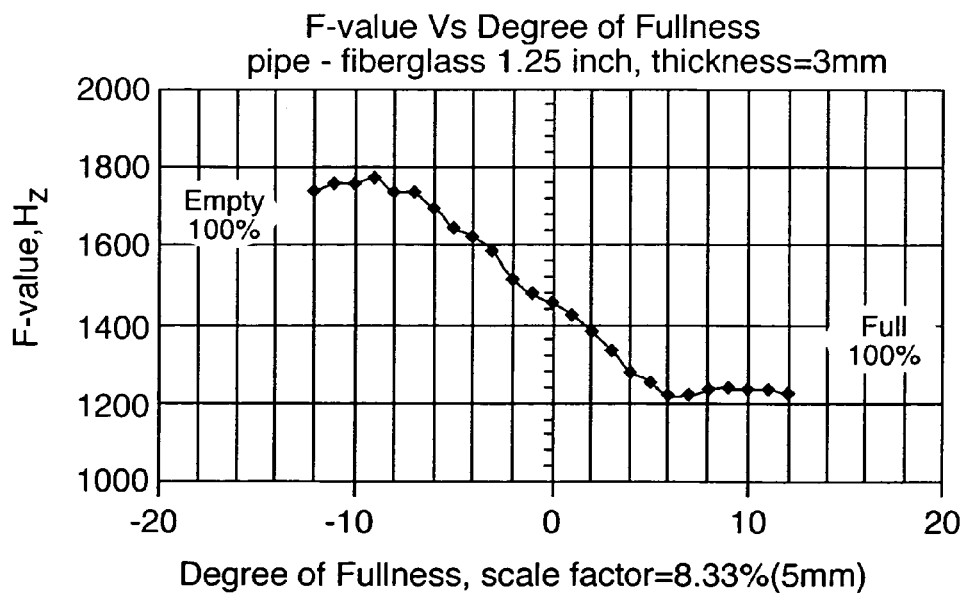
FIG. 4 shows a non-linear static transfer characteristic of the tested measuring system of FIG. 3.

The value of the effective height $h_e$ is not constant. It depends on many factors in addition to those that have already been discussed. In fact, $h_e$ is a random variable, as is the effective mass $m_e$. The stochastic nature of the instantaneous effective mass in the studied mechanical system complicates the level measurement. In order to improve the accuracy and repeatability of this measurement, we have equipped the measuring system with two brackets (not shown). The brackets create predictable and stable boundary conditions for mechanical oscillations in the vicinity of the center of the impact. In the tested embodiment, these brackets had the shape of a half-pipe cut along the pipe's longitudinal axis. Each bracket had a length of 150 mm. The use of the brackets secured the repeatability and the accuracy of measurement and provided for the linearity of the level measurement. The static transfer operator obtained for the tested embodiment is a linear function with saturation at $h^* \approx \pm L_b$, $L_b$ denotes the length of the bracket. The static transfer characteristic of the tested measuring system is shown in FIG. 4. In general, FIG. 4 shows a typical non-linear static transfer characteristic obtained by the method of the present invention of a system wherein the diameter of the vessel is substantially smaller than the length of the vessel.

The above-discussed theoretical and experimental research has led to the creation of the inventive non-invasive procedure for measuring the filling material level in vessels. A detail description of CRMP follows, which includes several possible embodiments of calculating the value of the evaluating variable.

CRMP includes two major operations: calibration and measurement. Calibration includes the following five steps. (To simplify mathematical notations, beginning here, the subscript "c" of the variable $\psi_c$ will be omitted.)

a. Step-by-step performing Basic Measurement Procedure (BMP) beginning from the filling material's interface positioned at the center of the impact to the filling material's interface distanced from the center of the impact toward the bottom of the vessel. The output of each BMP is the value of the evaluating variable, denoted $\psi(y)$, which is directly and unambiguously linked to the position of the filling material's interface relative to the center of the impact. The distance from the center of the impact to the filling material interface is denoted y.

b. Recording the value $\psi_1 = \psi(y_1)$ of the evaluating variable that is associated with the beginning of the lower saturation state of the measuring system's static transfer operator.

c. Step-by-step performing BMP beginning from the filling material's interface positioned at the center of the impact to the filling material's interface distance from the center of the impact toward the top of the vessel.

d. Recording the value $\psi_2 = \psi(y_2)$ of the evaluating variable that is associated with the beginning of the upper saturation state of the measuring system's static transfer operator.

e. Calculating parameters of the measuring system's non-saturated linear static transfer operator using the following formulas:

$$K = \frac{\psi_1 - \psi_2}{y_1 - y_2} \quad (9)$$

$$\psi^0 = \frac{(y_1 - y_2)\psi_2 - y_2(\psi_1 - \psi_2)}{y_1 - y_2} \quad (10)$$

wherein, K denotes the slope and $\psi^0$ denotes the intercept of the measuring system's static linear transfer operator.

The measurement operation for CRMP includes the following two steps:

a. Performing BMP, which output is the value of the evaluating variable $\psi(t)$ obtained at the moment t of time the BMP has been committed.

b. Calculating the level of the filling material in the vessel by the following formulas:

$$y(t) = K^{-1}[\psi(t) - \psi^0] \quad (11)$$

$$L_{fm} = H - y(t) \quad (12)$$

wherein, y(t) denotes the calculated distance between the filling material interface and the receiver in the case of a coaxial positioning of the center of the impact and the receiver (see FIG. 1b); and H denotes the height of the center of impact; $L_{fm}$ denotes the level of the filling material in the vessel.

Both the above-enumerated calibration and measurement operations of CRMP utilize a Basic Measurement Procedure (BMP). BMP includes the following four steps:

a. applying an impact load toward the vessel's external wall surface, such that the direction of the impact is not tangent to the vessel's external wall surface, passing through the center of the impact and indicating the moment of impact;

b. receiving a mechanical vibration that occurs on the external surface of the wall because of the impact;

c. measuring primary parameters of the vibration, including, for instance, amplitudes and frequencies, after implementing a predetermined delay from the moment of the impact; and d. calculating the value of the evaluating variable using the vibration primary parameters as input.

Various variables may be selected to serve as the evaluating variable that is calculated in step (d) of the BMP. In a first embodiment, the evaluation variable $\psi(t)$ may be the average of the frequencies within a predetermined amplitude range:

$$\{\forall A_i \in [A_1, A_2], i = \overline{1, n}\} \& t > t_0 \Rightarrow \psi(t) = n^{-1} \sum_{i=1}^{i=n} f_i \quad (13)$$

wherein, $[A_1, A_2]$ denotes a predetermined amplitude range satisfying the criterion of undisturbed vibration processing; n denotes the number of vibration frequencies $f_i$ determined on condition that $\forall A_i \in [A_1, A_2]$, i=1,n & t>$t_0$; $t_0$ denotes the moment of time when the load has been applied.

In a second embodiment, the evaluation variable may be the summation of the sine of the full periods of oscillation within a predetermined frequency range.

$$\{\forall \omega_i \in [\omega_1, \omega_2], i = \overline{1, m}\} \& t > t_0 \Rightarrow \psi(t) = \sum_{i=1}^{i=m} \sin(T_i)|_{A_i \in [A_1, A_2]} \quad (14)$$

wherein, $[\omega_1, \omega_2]$ denotes a predetermined frequency range satisfying the criterion of the mechanical standing waves non-generation; m denotes the number of full periods of oscillation determined on condition that $\{\forall \omega_i \in [\omega_1, \omega_2], i=1, m\}$ & t>$t_0$; and $T_i$ denotes the i-th full period of oscillation observed beginning the moment $t_0$.

In a third embodiment, the combined use of different evaluating variables, e.g., variable $\psi_{m1}(t)=\psi(t)$ from expression (13) and variable $\psi_{m2}(t)=\psi(t)$ from expression (14) allows the improvement of the repeatability and accuracy of the measurement. In the general case, this measurement approach may be described with the help of the following expression:

$$\psi(t) = q^{-1} \sum_{i=1}^{i=q} b_{mi} \psi_{mi}(t) \quad (15)$$

wherein, $\psi_{mi}(t)$ denotes the evaluating variable obtained by the i-th implementation of BMP; $b_{mi}$ denotes a weighting factor corresponding with the i-th implementation of BMP; and q denotes the number of implementations of BMP. The values of the weighing factors depend on the technical application the method is being applied.

In a fourth embodiment, mechanical oscillations in at least two different points on the external surface of the vessel may be monitored. These points are denoted $p_1, p_2, \ldots p_r$, with r denoting the number of these points. This approach also improves the accuracy and repeatability of the measurement. In this embodiment, the calculation of the evaluating variable includes output from each receiver positioned in each point $p_i$, $i=\overline{1,r}$. In the particular case of two receivers mounted in two separate points $p_1$ and $p_2$, the validation of the evaluating variable can be based on the criterion of constancy of the difference between the measured distances $y_{p1}, y_{p2}$ from each point to the filling material interface. Thus, only valid $\psi(t)$ are used for the measured level calculation:

$$y_{p1}(t_i) = K^{-1}[\psi_{p1}(t) - \psi^0]$$

$$y_{p2}(t_i) = K^{-1}[\psi_{p2}(t) - \psi^0]$$

$$y_{p1}(t_i) - y_{p2}(t_i) = \text{const} \Leftrightarrow \psi(t) = F[\psi_{p1}(t), \psi_{p2}(t)]. \quad (16)$$

According to a fifth embodiment, a substantial increase in the accuracy and repeatability of the level measurement is also achievable by the application of more than one impact load to the vessel's wall per measurement. In this case, the method of the present invention requires:

a. calculating the evaluating variable per each impact and storing its value for further processing as an element of the series of evaluating variables;

b. statistically treating the obtained series of evaluating variables and selecting at least one valid series;

c. determining the fact of the filling material presence or absence within the vicinity of the center of impact per each impact;

d. applying a Major Algorithm to each valid series of evaluating variables for the determination of the presence or absence of the filling material in the vicinity of the center of impact;

e. forming a status variable indicating the presence or absence of the filling material in the vicinity of the center of impact and having the status variable as the CRMP output in the case of a set-point level measurement or the material presence detection at the set-point level; and f. having the status variable indicating the presence of the filling material in the vicinity of the center of impact, and calculating the valid series-relating evaluating variable by the formulas:

$$\forall t_i, i=\overline{1,r}:$$

$$\psi(t_i) \in \psi_{valid} \Rightarrow y(t_i) = K^{-1}[\psi(t_i) - \psi^0]$$

$$\psi(t) = F[\psi(t_1), \psi(t_2), \ldots, \psi(t_r), t]$$

wherein, F[ ] denotes a function defined on the evaluating variables in the valid series, which output is the CRMP's resulting evaluating variable. In one possible embodiment, the ψ(t) variable may be calculated with the help of an aggregating function, such that:

$$F[\psi(t_1), \psi(t_2), \ldots, \psi(t_r), t] = r^{-1} \sum_{i=1}^{i=r} \psi(t_i) \quad (17)$$

In formula (17), F[ ] denotes the aggregating function defined on the set of evaluating variables obtained at each i-th impact in the valid sequence of r impacts.

In light of the above explanation, it can be seen that the set point level measurement is a particular case of the continuous level measurement. The set point level measurement can be attained by means of CRMP with unchanged BMP and a modified operation measurement as follows:
   a. performing BMP, which output is the value of the evaluating variable ψ(t) obtained at the moment t of time the BMP has been committed; and
   b. calculating the status variable on the level of the filling material in the vessel by the following formulas:

$$\forall \psi(t) > 0, \in_1 > 0, \in_2 > 0, \exists s(t):$$

$$|\psi(t) - \psi_{1s}| < \in_1 \Rightarrow s(t) = \text{"Filling material is below the level set point"}$$

$$|\psi(t) - \psi_{2s}| > \in_2 \Rightarrow s(t) = \text{"Filling material is above the level set point"}$$

wherein, the method's predetermined dead zone parameters denoted $\psi_{1s}$ and $\psi_{2s}$ are functions of the saturation points $\psi_1$ and $\psi_2$; s(t) denotes the status variable. In the simplest case, the saturation points could be calculated as follows: $\psi_{1s} = b_1\psi_1$ and $\psi_{2s} = b_2\psi_2$, where b1, b2 are predetermined coefficients. The condition $|\psi(t) - \psi_{1s}| = \in_1$ or $|\psi(t) - \psi_{2s}| = \in_2$ could be attributed to any binary value of the status variable s(t) depending on the technical specification of the application of the method.

It is clear that a multitude of forms is available for the implementation of the evaluating variable ψ(t) and the status variable s(t) in continuous and set point measurement applications including those described by expressions (13)-(18). However, all members of the population of evaluating and status variables correspond with the idea and the scope of the method of the present invention. The evaluating variables that were defined in the formulas (13)-(18) may serve as components of the vector $\psi_c$ in the integral description of the method of the present invention; refer to the expression (2).

Figure 5A:
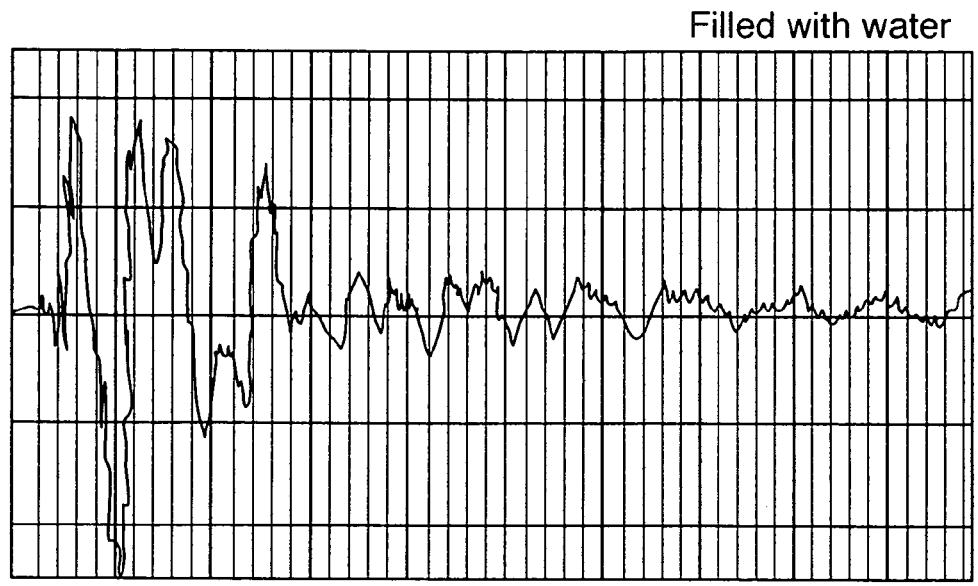
FIG. 5a depicts an oscillogram of mechanical oscillations in the experimental setting of FIG. 3 for a fiberglass pipe of 3.175 cm (1.25 inches) diameter and 3 mm wall thickness filled with water.
Figure 5B:
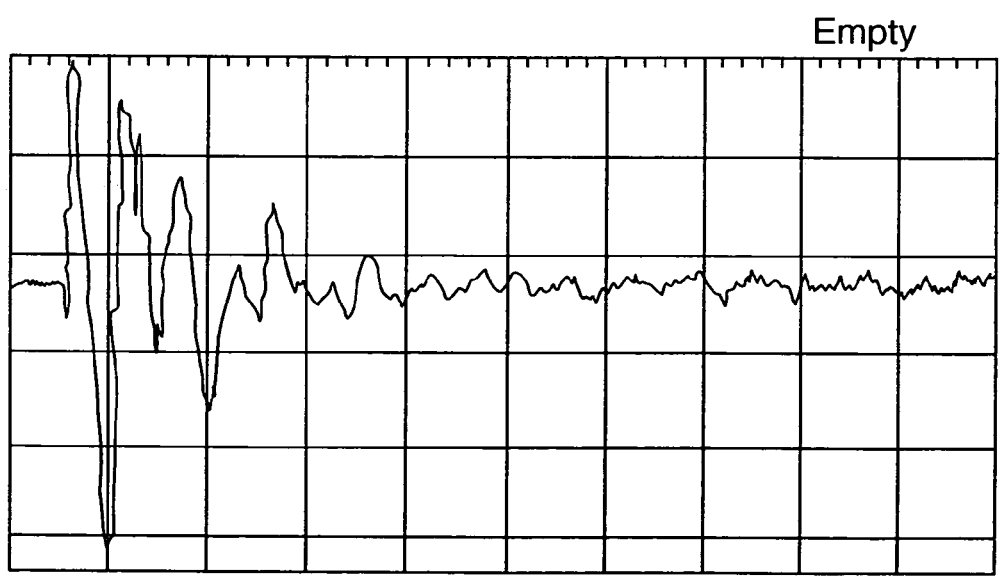
FIG. 5b depicts an oscillogram of mechanical oscillations in the experimental setting of FIG. 3 for an empty fiberglass pipe of 3.175 cm (1.25 inches) diameter and 3 mm wall thickness.
Figure 6A:
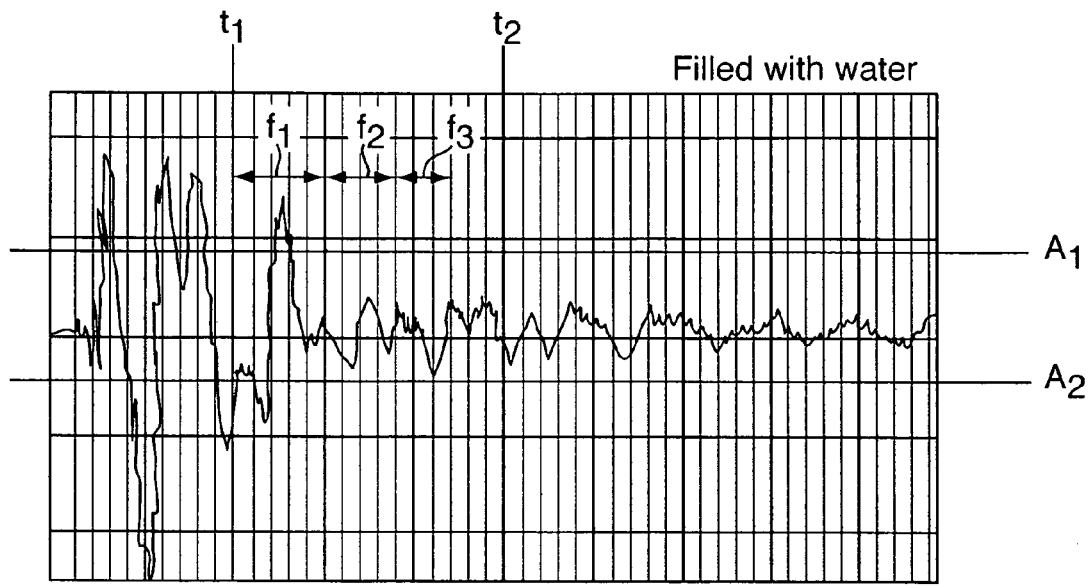
FIG. 6a depicts an oscillogram of mechanical oscillations for a pipe filled with water, showing time, frequency and amplitude.
Figure 6B:
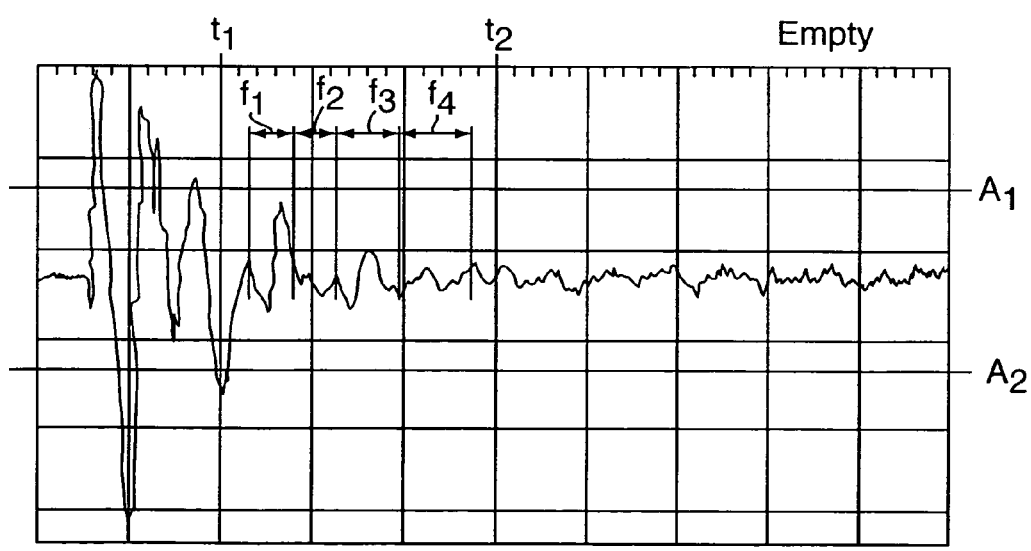
FIG. 6b depicts an oscillogram of mechanical oscillations for an empty pipe, showing time, frequency and amplitude.

FIGS. 5a and 5b depict sample oscillograms of mechanical oscillations for a fiberglass pipe filled with water and an empty pipe, respectively. FIG. 6a and FIG. 6b provide illustrative examples of forming the evaluating variable ψ(t) with the help of the oscillogram of mechanical oscillations in the above-described experimental setting with the fiberglass pipe. From FIG. 6a, for a pipe filled with water, the following values can be determined: $f_1=1.538$ KHz, $f_2=1.538$ KHz, and $f_3=1.0$ KHz, and the evaluating variable calculated: $\psi=(f_1+f_2+f_3)/3=1.304$ KHz. From FIG. 6b, for an empty pipe, the following values can be determined: $f_1=1.429$ KHz, $f_2=5.5$ KHz, $f_3=1.538$ KHz, and $f_4=1.25$ KHz, and the evaluating variable calculated: $\psi=(f_1+f_2+f_3+f_4)/4=1.5686$ KHz.

The execution of CRMP at more than one point on the outside wall of the vessel allows the level measurement beyond the vicinity of the center of the impact. In such case, the level of the filling material is measured in m points simultaneously or sequentially depending on the method's implementation. Both of these realizations of the method are based on the observation that the evaluating variable ψ(t) will change on condition that the filling material interface is located in the vicinity of one of m possible centers of impact. In other words, due to the saturation property of the measuring systems' static transfer operator:

$$\psi_j(t) \approx \psi_{1j} \text{ or } \psi_j(t) \approx \psi_{2j}$$

$$\psi_{1j} \rightarrow \psi^*_1, \psi_{2j} \rightarrow \psi^*_2, j=\overline{1,q}$$

wherein, q≦m is due to the saturation property of the measuring systems' static transfer operator; and $\psi^*_1$, $\psi^*_2$ are the upper and low saturation parameters, respectively, of the aggregated static transfer operator of the distributed system.

The method for the remote level measurement is based on the repetitive execution of CRMP, denoted RCRMP, and is realizable by a distributed measuring system. After an initial calibration, the distributed measuring system may utilize either a sequential method or a parallel method to determine the measured level. The sequential method may include the following sequence of operations:
   a. installing a single measuring system capable of originating and monitoring wall's oscillation at m predetermined points along the vertical axis of the vessel;
   b. beginning at a predetermined starting position on the vessel's outside wall, proceed with a step-by-step application of BMP until the following condition is satisfied:

$$\exists j \in [1,m] \subseteq \aleph: \psi_j(t) \in (\psi^*_1, \psi^*_1) \Rightarrow \psi(t) = \psi_j(t); \text{ and}$$

c. calculating the measured level by the following formulas:

$$y^* = (\psi^*_1 - \psi^*_2)/K^*$$

$$y_j(t) = [\psi(t) - \psi^0]/K^*$$

$$y(t) = (j-1)y^* \pm y_j(t)$$

$$L_{fm} = H - y(t)$$

wherein, $\psi^*_1$, $\psi^*_2$ and K* respectively denote the upper and lower saturation points and the gain factor of the aggregated transfer operator of the distributed measuring system implementing RCRMP; y* denotes the spread distance corresponding with the linear part of the measuring system's transfer operator; H denotes the height of the starting position for the measuring system; in the formula for the calculation of the y(t), the "+" in the "±" sign is for the starting point located at the bottom of the vessel and the "−" in the "±" sign is for the starting point located at the top of the vessel.

The parallel method may include the following sequence of operations:
   a. installing a plurality of measuring systems for originating and monitoring the wall's vibration in certain predetermined points along the vertical axis of the vessel;

b. substantially simultaneous applying BMP and determining the ordering number of the device, for which condition (19) is satisfied; and c. calculating the measured level using formula (20) where H denotes the height of the receiver's position for the first measuring system.

In addition to the remote level measurement, the utilization of the distributed system implementing RCRMP in applications with a multiplayer structure of the filling material having layers of different density makes possible material profiling during measurement.

Long Range Level Measurement Procedure

A Long Range Level Measurement Procedure (LRMP) has also been developed. LRMP is based on the notion that some elastic waves, including transverse waves propagating along the vessel's wall, will be reflected at the point of the medium's discontinuity [Karl F. Graff. *Wave Motion in Elastic Solids*. Oxford: Clarendon Press, 1975]. In the level measurement applications, such discontinuity could be due to the filling material attaching to the wall's inside surface. A transverse wave traveling along the vessel's wall meets the discontinuity at the height of the filling material interface and will be reflected back to the receiver. Therefore, the reflected waves deliver information regarding the level of the filling material in the vessel. Given this understanding, LRMP could employ any prior art distance measuring method including, but not limited to, pulse-based and continuous echo-processing techniques such as the Pulse Transit Time Method, Phase Difference Method, and Amplitude Change Method as disclosed in U.S. Pat. Nos. 5,793,704, 5,822,275, 5,877,997, 6,040,898 and 6,166,995 and other very sophisticated methods developed for seismic analyses [Note Online: *Refraction Seismic Methods*. www.mines.edu].

LRMP will be described below with the assumption that the measurement technique is based on the Pulse Transit Time paradigm. This technique seems to be particularly suitable for vessels with heights greater than 1.0 meter. LRMP can be implemented as a two-step procedure or as a one-step procedure.

The two-step LRMP includes two major operations—calibration and measurement. Calibration may be accomplished by the following two steps:

1. in the vessel with the known distance denoted y* between the filling material interface and the receiver of vibration, applying a mechanical load toward the vessel's external wall surface such that the direction of the impact is not a tangent passing through the center of the impact and indicating the moment of the impact; and 2. monitoring the reflected wave, measuring and storing the value of the time interval, $\Delta T^*$, between the moment of the impact and the moment the response to the impact has been indicated, such that the time interval $\Delta T^*$ is unambiguously associated with the distance y*.

Measurement for the two-step LRMP may be accomplished by the following three steps:

1. applying a mechanical load toward the vessel's external wall surface such that the direction of the impact is not a tangent passing through the center of the impact and indicating the moment of the impact;

2. monitoring the reflected wave, measuring and storing the value of the time interval between the moment of the impact and the moment the response to the impact has been indicated; and 3. calculating the measured level by the following formulas:

$$y = \frac{\Delta T}{\Delta T^*} \cdot y^* \quad (21)$$

$$L_{fm} = H - y$$

wherein, H denotes the distance between the center of the impact and the bottom of the vessel.

The one-step LRMP may be accomplished by the following four steps:

1. installing one or more additional receiver(s) of vibration at one or more predetermined distance(s) from the center of the impact to compensate for possible variations in the speed of the monitored waves propagation through the material of the vessel's wall. Therefore, the measuring system implementing the method is equipped with one master receiver and with at least one compensating receiver;

2. applying a mechanical load toward the vessel's external wall surface such that the direction of the impact is not a tangent passing through the center of the impact and indicating the moment of the impact;

3. substantially simultaneously monitoring the reflected waves by means of measuring and storing the value of the time interval between the moment of the impact and the moment the response to the impact has been indicated by the master ($\Delta T$) and the compensating receiver(s) ($\Delta T^*$); and 4. calculating the measured level by the formulas (19) for one compensating receiver by the following formulas:

$$f(\Delta T, y) = 0; \quad (22a)$$

$$f(\Delta T^*, y^*) = 0, \ |\Delta T^*| = n, \ |y^*| = n; \quad (22b)$$

wherein, the first equation, (22a), represents the relationship between the distance from the master receiver and the filling material interface; the second equation, (22b), represents the relationship between the distances from a plurality of compensatory receivers and the filling material interface. The above system of equations demonstrates one of several well-known approaches to the determination of a physical variable with the use of compensatory measuring devices and serves for the purpose of illustration.

In the particular case of the known distance y* and the measurable transit time $\Delta T^*$ provided by the compensatory receiver, the level measurement could be obtained by the following formulas:

$$y = \Delta T \cdot \frac{y^*}{\Delta T^*}$$

$$L_{fm} = H - y$$

for one compensating receiver or by the following formulas for more than one compensating receiver in the measuring system:

$$y = \Delta T \cdot \frac{\overline{y}^*}{\overline{\Delta T}^*}$$

$$\overline{y}^* = n^{-1} \sum_{i=1}^{i=n} y_i^*,$$

$$\overline{\Delta T}^* = n^{-1} \sum_{i=1}^{i=n} \Delta T_i^*$$

$$L_{fm} = H - y$$

Wherein, $\overline{y}^*$ and $\Delta T^*$ denote the aggregated calibrating distance and the aggregated calibrating wave travel time obtained with the help of n compensating receivers in the measuring system. It is clear that any kind of filtering or aggregation is applicable to the output of LRMP. The variable $\Delta T$ in the formulas (21) and (23) plays the same role as the evaluating variable $\psi(t)$ that was defined in the CRMP. Thus for the sake of better accuracy and repeatability of measurement, according to one possible embodiment, $\Delta T$ can be calculated as follows:

$$\Delta T = m^{-1} \sum_{j=1}^{j=m} \Delta T_j \qquad (24)$$

wherein, $\Delta T_j$ denotes the travel time obtained at the j-th measurement in the series of measurements of number m. The method of aggregation depends on the particular application for which the proposed method is being used and is not limited to formula (24). The evaluating variables that were defined in the formulas (21), (23) and (24) may serve as components of the vector $\psi_L$ in the integral description of the method of the present invention; refer to expression (2).

The above-disclosed method provides for a truly non-invasive measurement of a filling material level in a variety of vessels regardless of the vessel's dimensions and the vessel's material, as well as regardless of the physical properties of the filling matter. In addition, the present invention may be utilized to determined other physical parameters or properties of the filling material which have an effect on the mechanical oscillations of the system, including, for example, the density of the filling material.

Although the present invention has been described with respect to the detailed embodiments presented herein, it will be understood by those skilled in the art that various changes in form or detail thereof may be made without departing from the spirit and scope of the present invention.

The invention claimed is:

1. A method for non-invasive evaluation of the level of a filling material in a vessel, comprising:
   providing a first impact load at a predetermined load point on an external wall of the vessel to initialize a first oscillation in the wall of the vessel and in the filling material in the vessel;
   receiving a measure of the first oscillation at a first predetermined receiving point;
   analyzing the measure of the first oscillation received at the first predetermined receiving point to determine a first evaluating variable;
   determining a level of the filling material in the vessel based on the first evaluating variable; and
   performing a calibration procedure to determine a static transfer operator characterizing a response of an effective mass of a mechanical system responding to the first oscillation.

2. The method of claim 1, wherein the step of providing a first impact load includes providing a mechanical oscillation.

3. The method of claim 1, wherein the step of providing a first impact load includes utilizing an impact source being one of a solenoid, a spring-mass system, a hydraulic drive, an pneumatic drive, a ballistic percussion and a combination thereof.

4. The method of claim 1, wherein the step of providing a first impact load includes providing an impact load of one of a single pulse, a series of pulses and a continuous periodical load.

5. The method of claim 1, wherein the step of providing a first impact load includes providing an impact load modulated by one of an amplitude modulation, a frequency modulation, a pulse-code modulation and a combination thereof.

6. The method of claim 1, wherein the step of receiving a measure of the first oscillation includes sensing mechanical oscillations via a sensing element attached to an external wall of the vessel.

7. The method of claim 1, wherein the predetermined load point is located a first distance from a base of the vessel and the first predetermine receiving point is located at substantially the same distance from the base of the vessel.

8. The method of claim 7, wherein the first predetermined receiving point is located directly opposite to the predetermined load point.

9. The method of claim 1, wherein the predetermined load point is located at a first distance from a base of the vessel and the first predetermined receiving point is located at a second distance from the base of the vessel, the second distance being less than the first distance.

10. The method of claim 9, wherein the predetermined load point is located on a vertical axis and the first predetermined receiving point is located on substantially the same vertical axis.

11. The method of claim 1, further comprising:
    providing a second impact load at the predetermined load point to initialize a second oscillation in the wall of the vessel and in the filling material in the vessel;
    receiving a measure of the second oscillation at the first predetermined receiving point;
    analyzing the measure of the second oscillation to determine a second evaluating variable;
    determining a level of the filling material in the vessel based on the first and second evaluating variables.

12. The method of claim 1, wherein the step of determining a level of the filling material determines a first level of the filling material in the vessel, and further including:
    receiving a measure of the first oscillation at a second predetermined receiving point on an external wall of the vessel;
    analyzing the measure of the first oscillation received at the second predetermined receiving point to determine a second evaluating variable;
    determining a second level of the filling material in the vessel based on the second evaluating variable; and
    analyzing the determined first level of the filling material and the determined second level of the filling material to determine a more accurate level of the filling material in the vessel.

13. The method of claim 1, wherein the step of analyzing the measure of the first oscillation includes averaging the frequencies of the first oscillation within a predetermined amplitude range.

14. The method of claim 1, wherein the step of analyzing the measure of the first oscillation includes summing the sine of a plurality of full periods of oscillation within a predetermined frequency range.

15. The method of claim 1, wherein the step of analyzing the measure of the first oscillation includes determining a weighted summation of an average of the frequencies of the first oscillation within a predetermined amplitude range and a summation of the sine of a plurality of full periods of oscillation within a predetermined frequency range.

16. The method of claim 1, wherein the step of performing a calibration procedure includes determining a lower saturation state variable that defines a lower bound of a linear static transfer operator and determining an upper saturation state variable that defines an upper bound of the linear static transfer operator.

17. The method of claim 1, further including:
providing a second impact load at a second predetermined load point on an external wall of the vessel to initialize a second oscillation in the wall of the vessel and in the filling material in the vessel;
receiving a measure of the second oscillation at a second predetermined receiving point;
analyzing the measure of the second oscillation received at the second predetermined receiving point to determine a second evaluating variable; and
determining the level of the filling material in the vessel based on the first and the second evaluating variables.

18. The method of claim 17, wherein the step of providing a second impact load occurs at a time after the step of providing the first impact load.

19. The method of claim 17, wherein the step of providing a second impact load occurs at substantially the same time as the step of providing the first impact load.

20. The method of claim 1, further including:
sensing a reflection of an elastic wave propagating through the wall of the vessel, wherein the reflection is due to a discontinuity at the interface between the wall of the vessel and the filling material;
measuring a time interval between a time of application of the impact load and a time of sensing the reflection; and
determining the level of the filling material in the vessel based on the time interval.

* * * * *